SERIAL ACCESS MEMORY USING TRAVELING DOMAIN WALLS

Filed Nov. 23, 1966 4 Sheets-Sheet 1

INVENTOR.
PHILIP E. SHAFER
BY Edward J. Feeney Jr.
ATTORNEY

INVENTOR.
PHILIP E. SHAFER
BY Edward J. Feeney Jr.
ATTORNEY

Feb. 3, 1970 P. E. SHAFER 3,493,940

SERIAL ACCESS MEMORY USING TRAVELING DOMAIN WALLS

Filed Nov. 23, 1966 4 Sheets-Sheet 3

INVENTOR.
PHILIP E. SHAFER

BY Edward J. Feeney Jr.
ATTORNEY

SERIAL ACCESS MEMORY USING TRAVELING DOMAIN WALLS

Filed Nov. 23, 1966 4 Sheets-Sheet 4

INVENTOR.
PHILIP E. SHAFER

BY Edward J. Feeney Jr.
ATTORNEY

United States Patent Office 3,493,940

Patented Feb. 3, 1970

3,493,940

SERIAL ACCESS MEMORY USING TRAVELING DOMAIN WALLS

Philip E. Shafer, Holmes, Pa., assignor to Burroughs Corporation, Detroit, Mich., a corporation of Michigan Filed Nov. 23, 1966, Ser. No. 596,601
Int. Cl. G11b 5/00
U.S. Cl. 340—174 18 Claims

ABSTRACT OF THE DISCLOSURE

By increasing the propagation velocity of the traveling domain wall, beyond a particular level, in a thin magnetic film material, properly composed and prepared to a particular thickness, the transverse domain wall configuration becomes concentrated in a narrow band. Although the domain wall configuration structure is believed to remain jagged, its spread is reduced to less than one tenth of its original value. This radical reduction in domain wall width provides a memory configuration capable of a high degree of storage density.

This invention relates to a serial access computer memory without moving parts. More particularly, it relates to an all electronic substitute for existing drum, disk and tape memories, which utilizes the concept of the traveling domain wall on a flat geometrical element.

While there have been earlier traveling domain wall storage devices used in computer systems, such as shift registers employing magnetic thin films or magnetic wires, these earlier devices usually employed the presence or absence of the domain to signify the stored information. The domains were shifted through the length of the storage medium by cyclic non-uniform field patterns produced by drive conductors. However, the bit density obtainable with these previous devices was always limited by the jaggedness or irregularity of the domain wall. The existence of this jaggedness was therefore well known and it was believed that magnetic energy equilibrium considerations dictated that domain wall structures lined up with the hard direction could not be narrow but must be jaggedly irregular. The width of this irregularity approximated one millimeter and consequently has heretofore severely limited the storage density of such devices.

In addition, in earlier devices, it was thought that this width could not be reduced to any extent because as it was decreased the magnetic field intensity near the structure increased and the resulting increase in magnetostatic energy would violate the equilibrium conditions.

The spread out and jagged configuration of the domain wall also resulted in an external field that was neither concentrated nor even. Consequently any previous attempt to use the field of a traveling domain wall as a scanning element rather than a storage element would have likewise been restricted by its inability to achieve a high degree of storage density.

In the present invention, the moving domain wall is not used to store the information, rather it is used as the scanning means for retrieving information stored in a separate memory medium. This invention is made practical by the discovery that in certain thin magnetic film material properly composed and prepared to a particular thickness the transverse domain wall configuration becomes concentrated in a narrow band when its propagation velocity exceeds a particular level. Although the domain wall configuration structure is believed to remain jagged, its spread is reduced to less than one-tenth of its original value. This radical reduction in domain wall width provides a substantially improved memory configuration capable of a high degree of storage density.

It is therefore a principal object of the present invention to provide a magnetic memory system using traveling domain wall motion which has a high storage density.

It is also an object of the present invention to provide a high density storage system having a traveling domain wall medium which is operative under the influence of an externally applied uniform magnetic field.

It is still another object of the present invention to provide a high density storage system using traveling domain wall motion which uses flat sheets as removable memory means.

It is a further object of the present memory system to provide a high density storage system which uses a traveling wall domain element as a scanning means in conjunction with a separate storage means, wherein both said scanning and said storage means have geometrically flat thin film configurations.

It is also an object of the present invention to provide a new and improved memory device of high storage density which uses the field from a traveling domain wall along one magnetic thin film element as a scanning means to sequentially interrogate an adjacent thin film storage element.

These and other objects of this invention are realized in one illustrative memory which has individual storage cells, each of which includes a magnetically anisotropic thin film storage member having its easy direction perpendicular to its length and a magnetically anisotropic thin film scanning member having its easy direction parallel to its length.

The thin film scanning member includes the capability to support the travel of a magnetic domain wall. This domain wall is created crosswise to its length, i.e., in its hard direction.

The foregoing and other objects of this invention will be understood from a consideration of the following detailed description rendered in conjunction with the accompanying drawings, wherein.

Figure 3A:
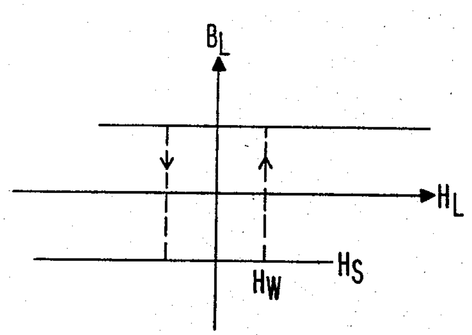
Figure 3B:
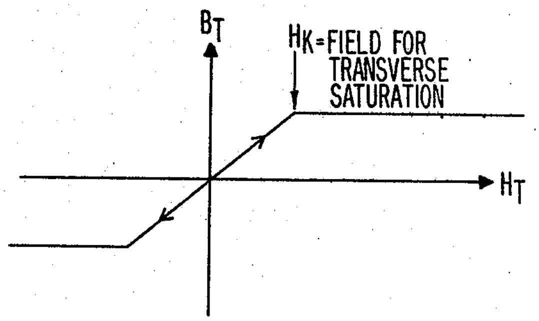

FIG. 3 includes FIGS. 3*a* and 3*b* and illustrates B–H loops for ideal traveling domain wall material.

Figure 4A:
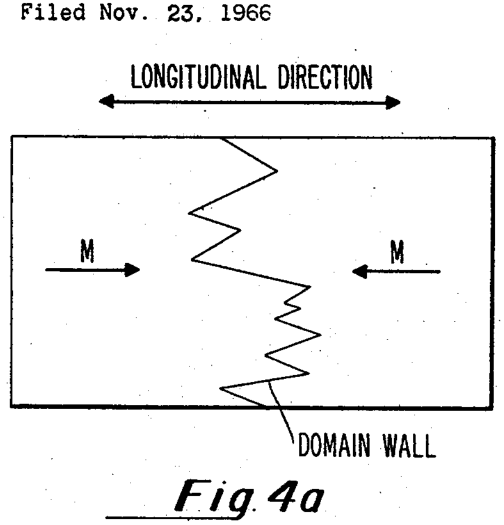
Figure 4B:
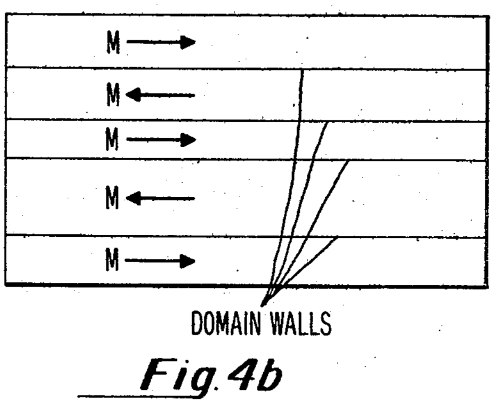

FIG. 4 includes FIGS. 4*a* and 4*b* and illustrates the static domain wall configurations in anisotropic thin films.

Figure 5:
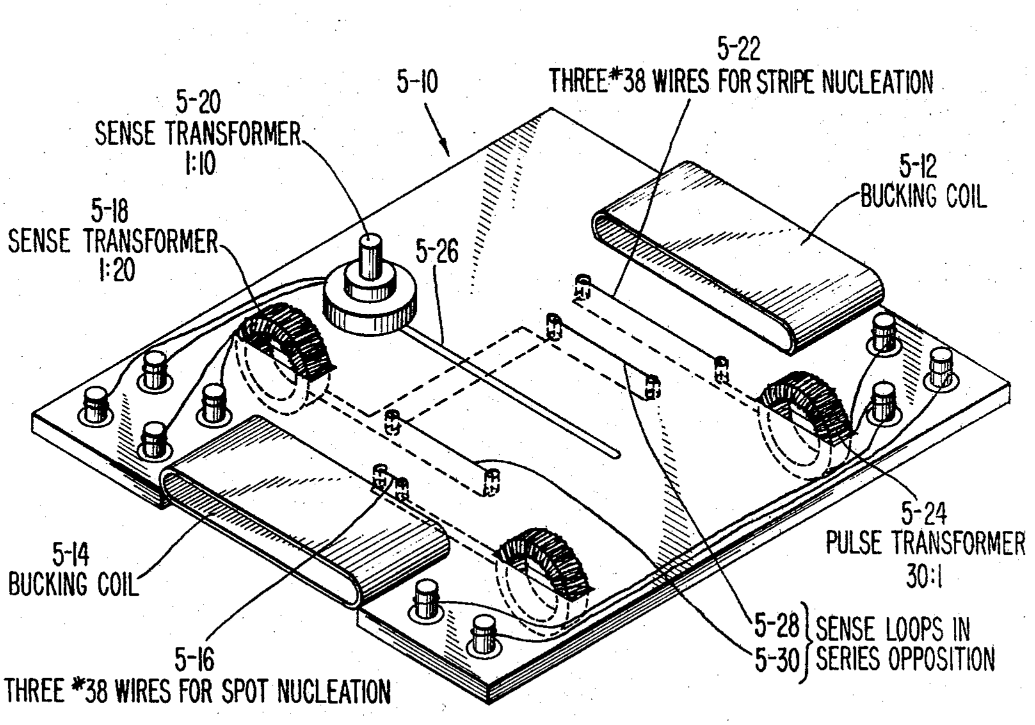

FIG. 5 is a pictorial wiring diagram of the traveling domain wall test jig.

Figure 6:
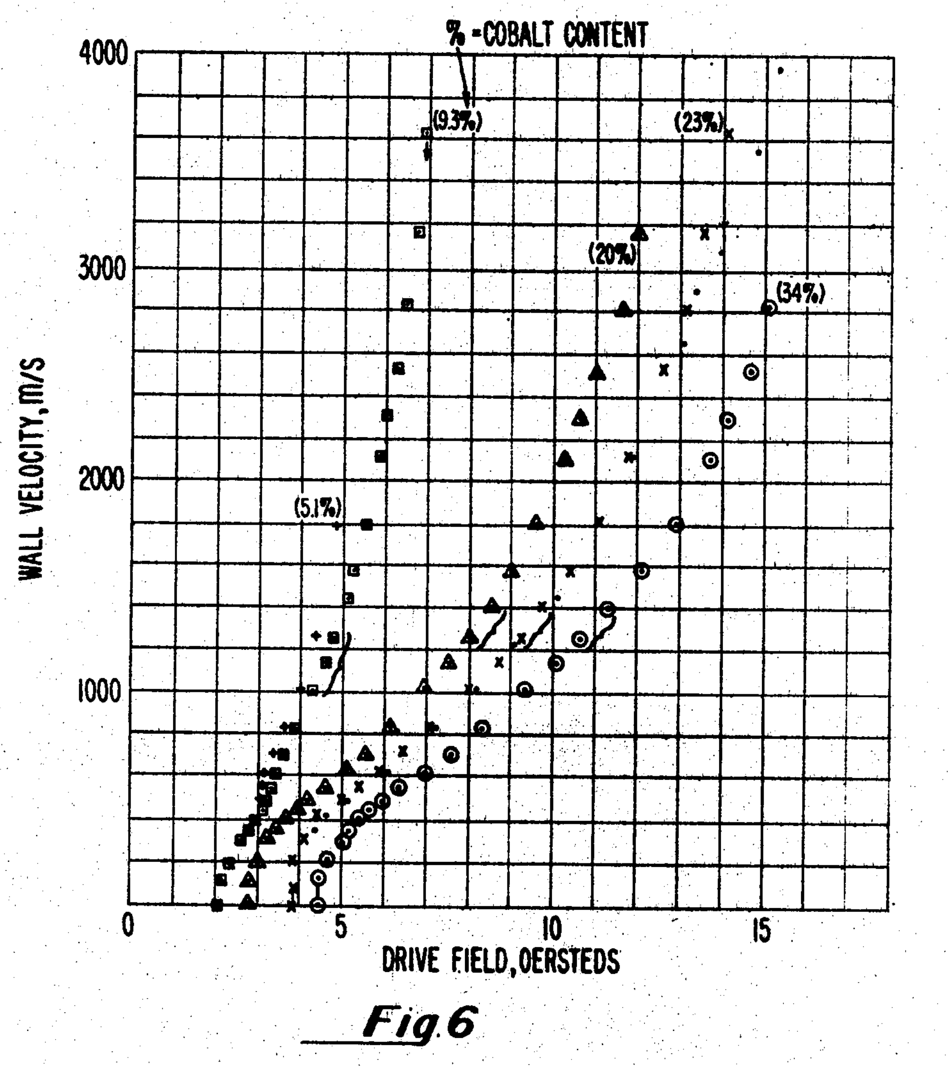

FIG. 6 graphically illustrates the domain wall velocity vs. field strength for varying percentages of cobalt in the composition.

Figure 7:
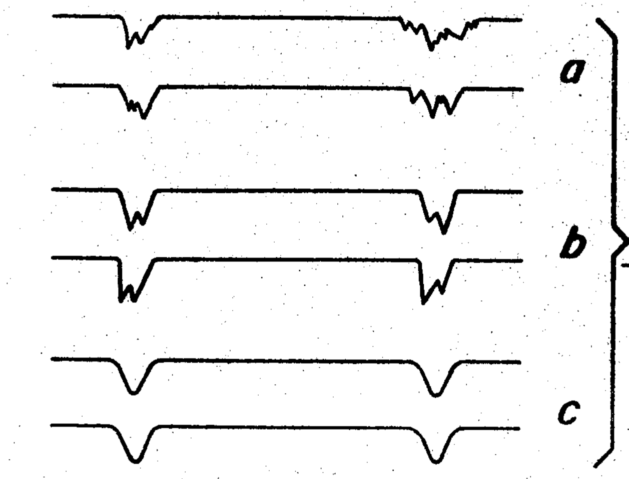

FIG. 7 includes FIGS. 7*a*, 7*b* and 7*c* and shows the effect of wall velocity on sense signal shape.

Figure 8:
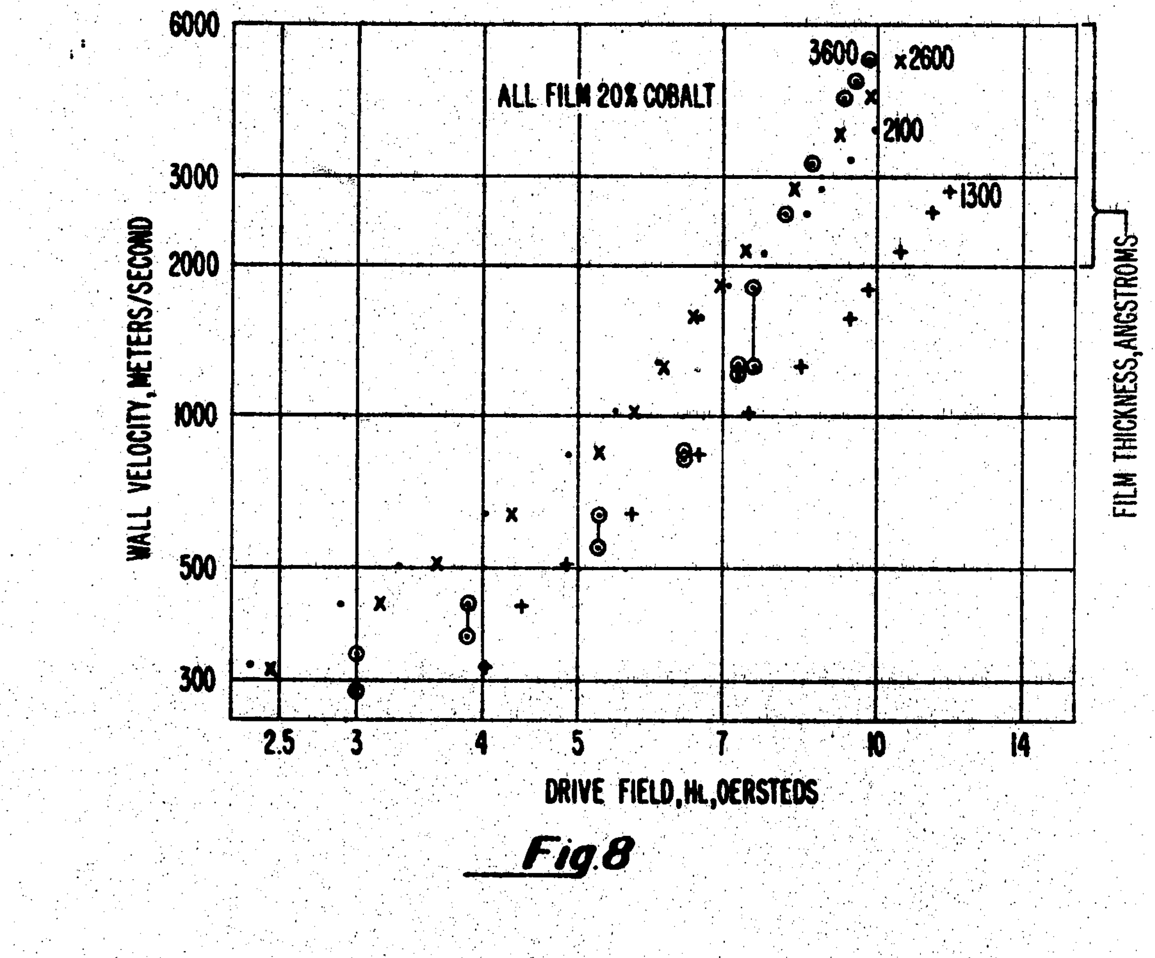

FIG. 8 graphically illustrates the domain wall velocity vs. field strength for varying thicknesses of film of a fixed composition.

Figure 9:
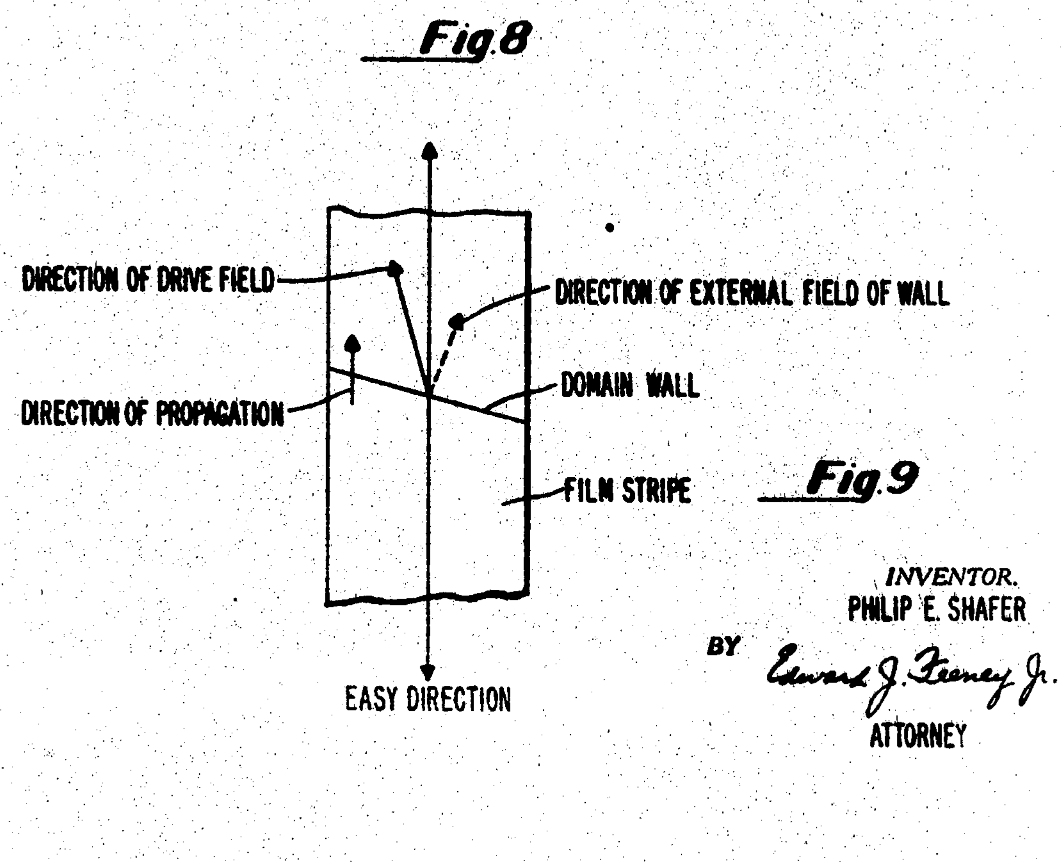

FIG. 9 is a diagram showing angled domain wall propagation.

It is to be understood that the figures are not necessarily to scale, certain dimensions being exaggerated conveniently for purposes of illustration.

Figure 1:
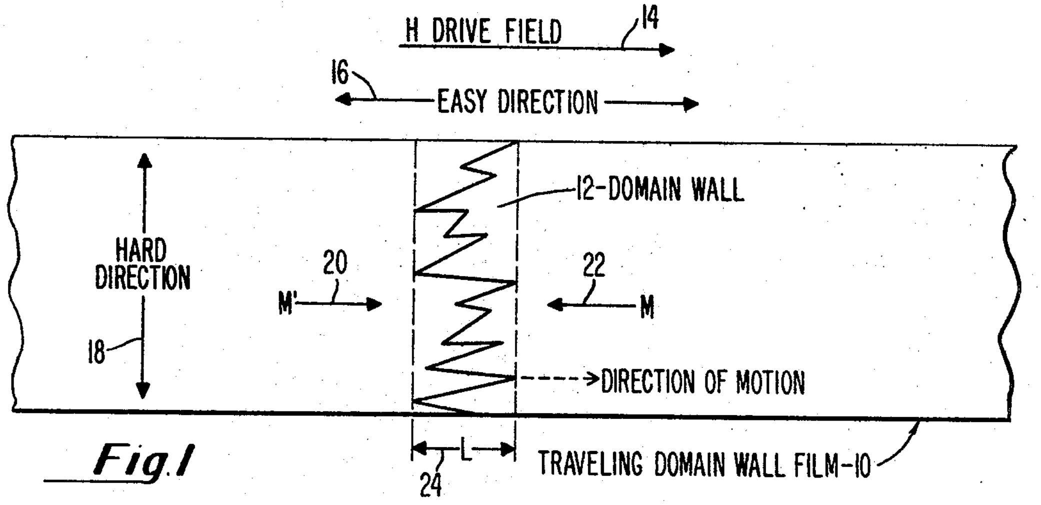
FIG. 1 depicts a greatly magnified representation of the domain wall in the hard direction of a magnetically anisotropic film.

In FIG. 1, there is illustrated a traveling domain wall film 10. The film is anisotropic having its easy direction 16 parallel to its length and its hard direction 18 perpendicular or crosswise to its length. After the film 10 has been magnetized by a first field 22, a domain wall 12 is initiated at the left hand side of the figure and moves in the direction shown under the influence of the H drive field 14. Its travel reverses the field of magnetization from the direction 22 to the M direction 20. The fact that the domain 12 is set up in the hard direction 18 for travel in the easy direction 16 causes the domain wall to exhibit a jagged or spread out configuration of length L, 24.

The present scheme, upon its face, appears impractical because the magnetic energy equilibrium considerations dictate that a domain wall structure lined up with the hard direction 18 cannot be narrow, but must look like domain wall 12 with an L width 24 of approximately one millimeter.

Further, the L width 24 cannot be much smaller because as it decreases the magnetic field intensity near the structure increases, and the resulting increase in magnetostatic energy violates the equilibrium conditions.

Attempts to use the jagged and spread out configuration of FIGURE 1 results in an external field thhat is neither concentrated nor even. If the domain wall film 10 is sufficiently separated from a storage means to even out the effects of the irregularities, then the resolution of the field is further degraded and its intensity reduced. Of course, a memory system using such a domain wall width is possible, provided the storage density requirements are sufficiently small. However, present day demands consider such densities to be undesirably low. Furthermore, if the domain wall 12 configuration is caused to move to the right, for example, by a uniform drive field 14, then the domain walls tend to move unevenly, further spreading out the transition region to decrease still further the storage density.

Figure 2:
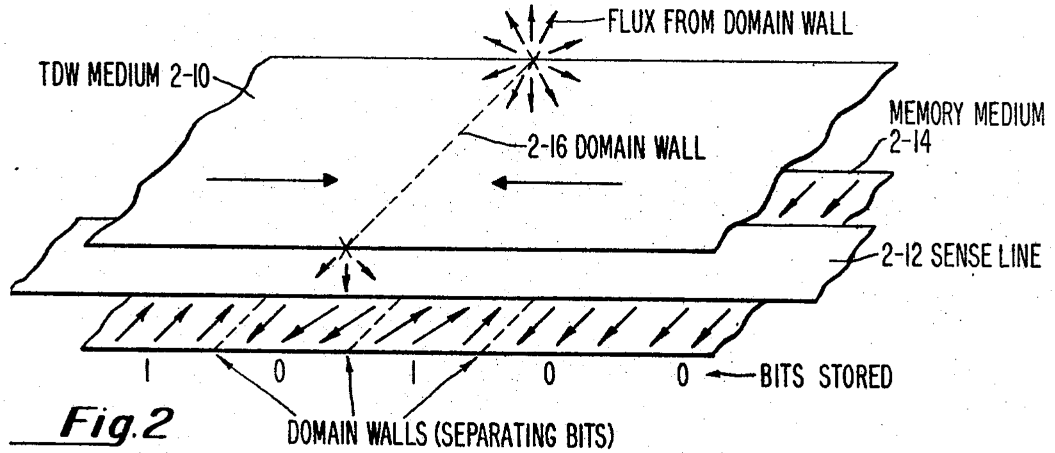
FIG. 2 illustrates the schematic arrangement of a flat strip traveling domain wall (TDW), its sense line and memory storage media.

The problems involved in assembling the TDW and the memory media into a working system can be followed by referring to FIG. 2. Here thhe traveling domain wall medium 2–10 and the nearby memory medium 2–14 are shown with the longitudinal directions of the two films being shown respectively horizontal to the figure. Several bits are shown magnetized as indicated by the arrows on the memory medium 2–14. The direction of magnetization in the traveling domain wall medium is also shown, with an X marking the instantaneous position of the domain wall, which crosses the film following the dotted line 2–16. The external field of flux from the domain wall 2–16 is sketched in roughly. The memory medium 2–14 will be sensitive only to the transverse component of the field, that is, the component lengthwise of the memory strip. This lengthwise component rotates the direction of magnetization of the memory bits directly under it as shown by the angle of the arrows so that a change in flux linking the sense line 2–12 produces a voltage output. The sequence of positive and negative voltages, produced respectively by ones and zeros, is amplified and used to control logic output. The polarity of the output voltage, of course, depends upon the stored magnetized direction.

This diagram omits the necessary structure required to control the traveling of the wall in the traveling domain wall material and to sense its position so that the bits can be properly clocked out. However, there are many ways this can be accomplished which are within the knowledge and capability of those skilled in the art to which this disclosure relates.

It is important to note at this point a few of the problems which were involved with this configuration. First, a lengthwise field must be applied to the traveling domain wall material 2–10 in order to propagate the domain wall 2–16. If this field is applied as a uniform overall field, then it will also affect the memory medium 2–14. For example, not only will it tend to rotate every bit stored in the memory medium, but it would also tend to erase the information so stored unless the characteristics of the memory medium are specified so that they are immune to this field. From this it becomes quite clear that making a domain wall medium, memory medium, and the necessary drive field all compatible represents a difficult materials problem requiring close balance of all factors.

Furthermore, if a large uniform field is used to drive the domain wall, a large amount of energy will be stored in the field and since the field must be reversed in order to restore the domain wall medium to its original state, a large amount of magnetic energy must be discharged and charged in the opposite direction representing large pulse power from the electronics control, system. Alternatively, a local field can be applied to the traveling domain medium 2–10 only, with the memory medium 2–14 being outside the field. This has the advantage that the local field will be of small volume and store little magnetostatic energy, and the memory medium 2–14 and the traveling domain 2–10 magnetic characteristics are not tied together by the magnitude of DC field required.

Other minor problems which had to be solved were the protection of the ends at the desired time. Also, a timing problem occurred when the domain wall was allowed to travel at its own characteristic velocity as determined by the DC magnetic field applied. It was also necessary to generate a clock from the wall motion itself by recording extra clock bits on the memory medium. However, other means could have also been used.

FIG. 3 shows the transverse (3*b*) and the longitudinal (3*a*) hysteresis loops in ideal TDW material. In FIGURE 3*a* the points of the loop represent nucleation field and the much smaller field of the vertical sides is the wall motion field. In an ideal material no hysteresis loop would be observed until the nucleation field is exceeded, whereupon a domain wall would appear and would move rapidly through the material, switching it to the other state. A large difference between nucleation field ($H_S$) and domain wall motion field ($H_W$) is desired because the velocity of the domain wall is a function of this difference and high velocity has been found to be desirable.

The distinction between the longitudinal and transverse direction in a thin film material is a characteristic which appears to be associated with the required large ratio between nucleation and wall motion fields necessary in TDW material. The distinction is also necessary for a good nondestructive read memory film. Thin films showing these characteristics are said to be anisotropic. The hysteresis loop for a longitudinal field is a square loop, as shown in FIG. 3*a*. However, the hysteresis loop for a transverse field displays almost no hysteresis at all, being a pair of practically superimposed lines, as shown in FIG. 3*b*. The coercive force is the force of the field required to move the domain walls, if they are present or to nucleate them if they are not present. A large variation in coercive force would, therefore, be observed, depending on the initial state of the film. The wall motion field, however, is a well defined characteristic of the particular material.

A domain wall in a ferromagnetic thin film can be either a smooth or a jagged line, depending on whether the discontinuity runs longitudinally or transversally with the easy direction of magnetization. This is shown in FIG. 4, in which the easy direction of magnetization is represented by M. The problem overcome by the present investigation was the reduction in the degree of jaggedness shown in FIG. 4*a*.

FIG. 4*a* illustrates this jagged configuration when the domain walls are created transverse to easy direction of the material. The jagged line shown is the characteristic shape of the domain wall as observed in all methods of observation for all types of materials.

However, this jaggedness is non-existent when the domain walls are created parallel to direction of easy magnetization of the material. This is readily seen in FIG. 4*b* which illustrates the usually observed configuration for such a structure.

Since the jagged shape illustrated in FIG. 4*a* tends to blur and reduce the resolution, the external magnetic field is, therefore, unfavorable for high density operation. Various brute-force methods of forcing the jaggedness to be of fine scale were considered in some detail. However, in view of the present discovery, these previous concepts need no further discussion.

For the study of domain wall motion in the present apparatus, a test jig was constructed to observe the wall motion electrically. Optical observation of the present apparatus is virtually impossible because the only suitable methods known are the Kerr magneto-optical method and the Bitter Pattern method. Both of these were too slow to follow the fast motion of the present apparatus. The Kerr effect is a very small effect involving only a few minutes of arc in the rotation of the plane of polarized light reflected from the magnetized surface. As a result, less than one millionth of the collimated light intensity passes through the optical system. Moreover, at the front end of the process, only a fraction of a percent of the light from the light source enters the collimated beam. Estimates of the light intensity required to produce a short exposure sufficient to stop the motion of a moving domain wall suggest something like 100 megawatt giant pulse laser would be necessary. Although such a system is theoretically possible, it seemed an unwise approach when the expected results were weighed against the required expenditure. The Bitter Pattern method depends for its effectivity on the alignment of submicroscopic ferromagnetic particles in a colloidal suspension. Since the speed at which this alignment occurs is limited to the random mixing supplied by the Brownian movements, reaction time is too great to stop the wall motion.

The wiring diagram of the TDW test jig used is shown in FIG. 5. In this system a strip of thin film material is placed in a uniform external field opposite to the direction of magnetization and a region of reversed magnetization is nucleated by an instantaneous large field applied near one end. The domain wall produced, propagates down the film, and the accompanying external field induces a voltage in sense wires which are placed transverse to the strip at intervals down the film. The time between sense signals indicates the velocity of the domain wall and the shape of the sense signals gives some evidence of the configuration of the wall as it passes.

A pair of large square Helmholtz coils, not shown, supplies a large and very accurately measured driving field which encompasses the entire thin film sample, when it is placed on the test jig. Smaller rectangular coils are placed in the center of the Helmholtz coils and are used to supply a reversed sweeping field strong enough to overcome the DC field of the large coils and restore the film to its original state in preparation for another TDW event. The current in these reverse sweeper coils is a half-wave rectified 60-c.p.s. pulse which reverses the magnetization of the thin film strip mounted in the center of the jig and sweeps it clean of all nucleated domains. A thin film plate is initially mounted on the test jig. Additional small coils are used around the end of the thin film plate to carry a current which produces a field proportional to but opposite to the field of the large Helmholtz coils, thereby protecting the ends of the thin film from the large drive field. This prevents spurious nucleation at the ends.

To prevent the same effect from occurring along the edges, the thin film has been evaporated through a mask so that the edges are tapered in thickness. This protects the edges from spurious nucleation because of the following phenomenon. As the magnetic material becomes thinner, its wall motion field increases to the point where the wall motion field at the thin edges of this evaporated strip can be larger than the nucleation field at the thicker central portion. Therefore, if the sweeping field produced by the sweeper coils is larger than the drive field, the domain walls are moved out into the thin region of the edge and they cannot be moved back again by the drive field.

At the end of a half sine wave pulse and after a time delay for disturbances to decay, a nucleation pulse is applied to one end of the thin film strip and the domain wall thereby nucleated moves under the influence of the accurately measured DC field. The velocity of the domain wall is measured from an oscilloscope by measuring the time between pulses from sense loops spaced a fixed distance apart.

This test jig 5–10 is crossed by five windings. Starting at the upper right hand portion of the jig, there are, first, three parallel wires 5–22 for stripe nucleation of the domain wall. Pulse current flows down the center wire and returns to the outer wires in parallel. A highly concentrated and very narrow region of high field is therefore produced. This three wire nucleation winding is driven by a pulse transformer 5–24 with a 30 to 1 turns ratio.

The next wire 5–28 crossing the test jig is one of the sense loops which returns beneath the board. The third conductor 5–26 is a double wire crossing the center of the test jig. It is a special sense loop to sense the degree of resolution of the domain wall. It is connected to a very wide band transformer 5–20 with 10 to 1 step-up to produce a signal large enough to be observed on the oscilloscope. The fourth wire is the single wire 5–30 of the second sense loop which returns beneath the board. The two sense loops are connected in series to one pulse transformer 5–18 with 20 to 1 step-up to produce a signal large enough to be observable. The last winding 5–16 is a very short three-wire nucleation winding which comes up to the surface of the board and almost immediately goes below the surface, so the region of high field is such that a very small spot is nucleated. This winding is driven by the pulse transformer 5–32 and one or the other of the two nucleation windings can be driven at the operator's choice. The solenoid windings or bucking coils 5–12 and 5–14 at top and bottom, are for the purpose previously noted of applying a reversed DC field at small magnitude to the extreme ends of the thin film strip in order to prevent the demagnetizing field of the thin film strip from producing spurious nucleation.

It was found that these protective solenoids at each end of the jig were not always necessary. The taper at the ends of the strip apparently was sufficient to reduce the demagnetizing field near zero in most cases. However, in some cases defects or bad edges were found and the protective windings were necessary.

With this test system it is possible to reproduce measurements of the wall velocity versus field with accuracy of better than 1 percent of the field required for a given velocity.

Operation of the test jig showed that the wall velocity versus drive field function was a curve as shown in FIG. 6 where the wall velocity versus field relation is shown for several different compositions, containing varying amounts of cobalt and nickel-iron, in proper proportion for zero magnetostriction.

All of the curves of FIG. 6 are for film thicknesses in the range from 1000 to 1500 angstroms.

It is seen that the velocity is following a smooth curve which passes through zero velocity at zero field except that it breaks off at the wall motion field, $H_W$, where the wall motion velocity is zero. The curvature of the curves suggested a change, although not a sudden change, in the mode of propagation at higher fields.

However, most interesting of all for the present concept is a change in the domain wall configuration at approximately the velocity shown bracketed in the curves of FIG. 6. In this velocity range the wall configuration changes from a typical jagged shape as suggested by the jagged sense wave forms produced at lower velocities, to what appeared to be a clean straight line transverse to the film at higher velocities. The sense signal wave forms shown in FIG. 7 show this clearly. At the lower wall velocities shown in FIG. 7*a* at the top of the sheet, the sense signals are very jagged and of rather low amplitude as the several points of the jagged domain wall pass the sense loop. At the high velocities of FIG. 7*c* at the bottom of the sheet, the sense signals are very clean and narrow and highly repeatable. In the transition region shown in FIG.

7b at the middle of the sheet, the sense signals are usually clean but occasionally show some irregularity. The curves of FIG. 7, therefore, show a single event of domain wall propagation for each trace, and the slight irregularities in time of propagation are clearly visible. Also, in the slow traces, the non-reproducibility of the jagged shape of the domain wall is evident.

The reality of the domain wall straightening phenomenon is confirmed by two additional experiments. In the first experiment, instead of nucleating the domain wall as a straight line transverse to the film, it was nucleated as a very small spot. The experiment showed that in the short distance of propagation (⅜ inch) between nucleation and the first sense loop, the small spot had expanded to the full width of the film and the wall had become straight. In a second experiment the film sample was inserted in a skewed fashion in the test jig. The domain wall was then nucleated as a straight line parallel to the sense loops and orthogonal to the drive field, but skewed to the transverse direction of the film. By the time this skewed wall had propagated to the first sense loop, it had become a straight wall transverse to the film and therefore skewed to the sense loop and produced a signal in the sense loop which was a square topped pulse.

This straightening of the domain wall is extremely desirable for the present application, and since it occurs automatically at sufficient wall velocity, no brute force methods are necessary. It remains to show that the wall straightening phenomenon also occurs in thicker films which will produce adequate external field to drive the memory medium, and also to show that films can be produced sufficiently free from defects so that they can be driven hard enough to produce this prenomenon without spontaneous nucleation.

The TDW velocity of propagation at a given value of drive field was found to increase with thickness of the film, as shown in FIG. 8. The data for these samples make it appear that the domain wall velocity is related to the fraction of the nucleation threshold field ($H_o$) that is applied as drive.

If this relationship is valid, then the variation of velocity with composition is explained and the lower cobalt films have lower nucleation thresholds. The increase of velocity with thickness is an independent effect and it is then quite possible that an expression may be developed for the domain wall velocity as a function of the film thickness and the ratio of drive field to nucleation threshold.

The domain wall straightens out in all films observed to date, provided that nucleation defects do not prevent the application of sufficient drive. The straightening occurs over a narrow range of velocity, certainly less than 20 percent. The velocity at which the domain will straightens appears to depend solely on the thickness of the material, being quite independent of $H_k$, $H_c$, $H_o$ as they are affected by composition and conditions of deposition. The velocity above which the wall is straight varies from about 800 meters per second in films 800 A. thick to over 4000 meters per second in films 3300 A. thick.

However, this straightness of the domain wall is not perfect. Sense signals always show some non-uniformity in amplitude and width, indicating variations in the straightness of the wall as it passes the sense line. The amount of this residual irregularity is sensitive to the film quality, and probably represents a dynamic balance between the forces tending to straighten the wall and the irregularities introduced by defect points in the film.

The straight domain wall has been observed to move at an angle to the easy direction of film when the drive field is at an angle. FIG. 9 shows the phenomenon schematically. The measurement was made by rotating the external field to align the wall with an angled parallel wire sense loop. In the present configuration, the alignment was detected by adjusting for maximum sense signal, and the sense signal amplitude varied irregularly because of residual wall irregularities.

In one measurement obtained the angle of the wall rotated four times the angle of the drive, and wall rotations up to 15° were observed. The diagram of FIG. 9 suggests a reason for this phenomenon: Perhaps the domain wall rotates to such an angle that at some critical distance ahead of the wall the transverse component of its external field cancels that of the drive field, and the net field is exactly in the easy direction. The angle of rotation of the wall has been estimated in some other cases by the lengthening of the sense pulse as the wall crosses a sense line at an angle. One of the field switching films shows a factor of about 20 to 1 between wall angle and field angle.

The tilting of the wall with tilted field may be of importance for the present memory, because the information recorded on the memory film may produce sufficient cross field to produce appreciable tilt, thus affecting the resolution.

Another very interesting phenomenon was produced by placing a conducting plane close to the propagating domain wall. A thick highly conductive sheet of copper or aluminum increased the domain wall velocity 5–10 percent, whereas a thin sheet (0.7 mil copper) or one of lower conductivity (thick beryllium copper), lowered the velocity a similar amount.

These phenomena may be explained by the fact that a highly conductive sheet prevents the penetration of flux so that the field ahead of the domain is increased, increasing the velocity. A lower conductivity sheet permits the penetration of flux, which is then trapped by slowly decaying eddy currents. As the wall moves forward, the trapped flux lagging behind represents a retarding field, reducing the net drive field in the neighborhood of the wall and slowing it down.

In summary, this invention disclosed herein concerns a serial access computer memory without moving parts. Binary information is recorded on a "track" or storage film which consists of a long narrow strip of a thin magnetic film. This memory film is anisotropic, with its easy direction crosswise of the track. The binary information (1 or 0) is stored in the easy direction (right or left) of crosswise magnetization. A sense line running parallel and close to the track as linked by some of the external flux of the track. Information is read from the track by applying a lengthwise magnetic field to a short length of the track, the length so driven corresponding to the length occupied by one bit of information. The lengthwise field rotates the magnetization of the track away from its crosswise or easy direction, thereby decreasing the flux linking the sense line and so inducing a signal voltage on the sense line, with the sign of the signal indicating the value of the bit of information. All the stored bits are sequentially read out in serial fashion by moving the local magnetic field down the length of the memory track. The memory film is so composed and prepared that it is possible to adjust the reading field to produce adequate sense signal without disturbing the stored information. This, of course, enables the information to be read repeatedly without requiring restoration.

Writing is accomplished by increasing the moving field so that it saturates each bit spot in the hard direction as it passes. A current in the sense line produces a "tipping" field in the easy direction. As the scanning filed leaves each bit spot, the spot returns to one or the other polarity of the easy direction depending on the instantaneous polarity of the tipping field. The bit spots may, therefore, be left in the desired states by synchronizing polarity reversals of the sense line current with the passage of the scanning field down the track.

The moving magnetic field for scanning is produced without mechanical motion by using the external field of a moving domain wall through a second thin magnetic film. This second film, called the traveling domain wall (TDW) film, is also anisotropic, but its easy direction is parallel to the track or tracks of the memory film. The domain wall configuration in the TDW film is lined up crosswise, or parallel with the hard direction, and since the magnetization is lengthwise, with a reversal at the domain wall, all the magnetic flux of the TDW film must leave the film at the domain wall. This produces a strong external field at that point which supplies the necessary local drive field for the memory track.

As previously noted, this scheme initially appeared impractical because the magnetic energy equilibrium considerations dictated that a domain wall structure lined up with the hard direction could not be narrow, but must look like FIG. 1, with a width L of the order of one millimeter. Further, L could not be much smaller, because as it decreased the magnetic field intensity near the structure increased, and the resulting increase in magnetostatic energy violated the equilibrium conditions. The spread out and jagged configuration of FIG. 1, however, resulted in an external field pattern that was neither concentrated nor even. In addition, if the two films were separated enough to even out the irregularities, then the resolution of the field was further degraded, and its intensity reduced. The resulting memory system, even if possible, would have a usable bit density along the track which would be undesirably low. Furthermore, if the domain wall configuration was caused to move, say to the right, by a uniform drive field, then the domain walls would tend to move unevenly. This, of course, further widened the transition region.

Domains defined by such jagged domain wall configurations have been used to store information in a shift register, using thin film material or magnetic wire. The domains whose presence or absence signifies the stored information are shifted through the length of the storage medium by cyclic nonuniform field patterns produced by drive conductors. However, the bit density obtainable was limited by this domain wall, irregularity.

In the present invention the moving domain wall is not used to store information, but is merely the scanning means for information stored in the separate memory medium. The invention is made practical by the fact that in thin magnetic film material properly composed and prepared, the transverse domain wall configuration becomes concentrated in a narrow band when its propagation velocity is sufficiently high. The domain wall configuration structure is still probably complex, perhaps somewhat like the jagged structure of FIG. 1, as indicated by electrical signals induced by it, but L, the width of the structure, is of the order of 0.1 mm. or less. Furthermore, the configuration is dynamically stable; no matter what domain wall shape is initiated after a short distance of propagation under the influence of a uniform longitudinal field, the straight transverse structure forms and remains stable in width and accurately straight and transverse while propagating throughout the remaining length of TDW film.

A memory system is shown which uses a solenoid to supply drive field for the TDW. The one used is a two-piece printed circuit; however, a wire winding can be used. Further, the sense line need not be between the films, as shown, but could be on the back side of the memory film substrate.

The field from the TDW radiates cylindrically as from a line of poles and at a point vertically distant $y$ from the film and $x$ horizontally from the line of the wall, the horizontal field component to which the memory film is sensitive is proportional to $$\frac{x}{x^2+y^2_9}$$

This field function has positive and negative peaks at $x=\pm y$, and the memory film magnetization would therefore be rotated equally in opposite directions at the two peaks. Since the sense signal is independent of the direction of rotation (the flux linkage decreases in either case), each bit would be read twice by this field function, which is undesirable. A steady uniform field was therefore added to shift the baseline so that the field function would have a small negative and a large positive peak. It can be shown that the signal on the sense line is approximately proportional to the square of the drive field, the small negative peak and the small bias field produce very little signal, so essentially a single response is obtained.

Writing is accomplished by applying an information field (in the easy direction) to the memory material during the fall time of the hard direction drive. Although memory material has been prepared which requires the same drive for reading and writing, it is difficult to reproduce, and a larger drive field is usually required for writing. This can easily be accomplished by increasing the bias field for writing, so that a larger positive peak field is obtained.

No effort has been made to exhaust the possible embodiments of this invention. It will be understood that the embodiments described are merely illustrative of the principles of this invention and various modifications may be made therein by one skilled in the art without departing from the scope and spirit of the invention.

What is claimed is:

1. A high density memory storage device comprising a storage element having bidirectional sensitivity to a local magnetic field parallel to its length and having binary information stored thereon in the direction of sensitivity of successive segments thereof, a magnetically anisotropic traveling domain wall scanning element having its hard magnetization direction perpendicular to its length, a means for creating a domain wall in said scanning element which is parallel to its direction of hard magnetization and a means for causing said domain wall to travel along said scanning element in a direction parallel to its easy magnetization, said storing and said scanning elements being positioned to each other such that the travel of said domain wall along the easy direction of said scanning element sequentially accesses the binary information stored in successive segments of said storage element.

2. A high density magnetic storage device comprising a magnetically anisotropic storage element having a bidirectional easy magnetization perpendicular to its length with binary information stored in successive segments thereof, a magnetically anisotropic traveling domain wall scanning element having its hard magnetization direction perpendicular to its length, a means for creating a domain wall in said scanning element which is parallel to its direction of hard magnetization and a means for causing said domain wall to travel along said scanning element in a direction parallel to its easy magnetization, said storage and said scanning elements being positioned to each other such that the travel of said domain wall along the easy direction of said scanning element sequentially accesses the binary information stored in successive segments of said storage element.

3. The high density magnetic storage device as set forth in claim 2 above wherein said storage element and said scanning element are each comprised of magnetic thin films deposited upon suitable surfaces and the magnetic films respectively deposited possess the specified magnetic anisotropy.

4. The high density magnetic storage device as set forth in claim 2 further including a write/sense means positioned adjacent said scanning and said storage elements.

5. The high density magnetic storage device as set forth in claim 4 wherein said write/sense means is a conductor element positioned between said storage and said scanning elements.

6. The high density magnetic storage device as set forth in claim 5 wherein said write/sense means includes a conductor element located between said scanning and said storage means, a write current source, a read amplifier and a switching means, said switching means continuously connected to said conductor element and switchably connected to said write current source and said read amplifier.

7. A high density magnetic storage device comprising a magnetically anisotropic thin film storage element with its easy direction perpendicular to its length, a magnetically anisotropic thin film traveling wall domain scanning element with its easy direction parallel to its length, said scanning element positioned adjacent and longitudinally parallel to said storage element, a conductive sense element located between said scanning and said storage element, a drive field source positioned in relation to said device to apply a uniform drive field longitudinally along said scanning element, and means coupled to said scanning means to create a domain wall parallel to its hard direction for longitudinal travel along its easy direction under the influence of said drive field.

8. A high density magnetic storage device comprising a magnetically anisotropic thin film storage element with its easy direction perpendicular to its length, a magnetically anisotropic thin film traveling wall domain scanning element with its easy direction parallel to its length, said scanning element positioned adjacent and longitudinally parallel to said storage element, a write/sense means positioned adjacent sair scanning and said storage elements, a drive field source positioned in relation to said device to apply a uniform drive field longitudinally along said scanning element, and means coupled to said scanning means to create a domain wall parallel to its hard direction for longitudinal travel along its easy direction under the influence of said drive field.

9. The high density magnetic storage device as set forth in claim 8 wherein said magnetically anisotropic thin film traveling wall domain scanning element is comprised of magnetic material having between 15 and 25% cobalt content.

10. The high density magnetic storage device as set forth in claim 8 wherein said magnetically anisotropic thin film traveling wall domain scanning element is comprised of magnetic material having a thickness of between 800 A. and 4,000 A. and is driven by said drive field at corresponding velocities of between 800 meters/second to 4,000 meters/second.

11. The high density magnetic storage device as set forth in claim 8 wherein said magnetically anisotropic thin film traveling wall domain scanning element is comprised of magnetic material having a cobalt content approximately equal to 20% of total, and said drive field is approximately equal to 10 oersteds to drive said traveling domain wall at a velocity approximately equal to 1,300 meters/second.

12. The high density magnetic storage device as set forth in claim 8 further comprising a highly conductive sheet of material placed closely adjacent to the propagating domain wall.

13. A method for providing a high density magnetic storage device comprising the steps of applying to a suitable surface a magnetically anisotropic thin film having at least 20% cobalt content and further having traveling domain wall characteristics, said anisotropically applied film having its easy direction longitudinal along said surface, next applying a starting field to said film to create therein a domain wall, applying a driving field of sufficient magnitude to said film to cause said domain wall to become perpendicular, to substantially reduce its width and to cause it to longitudinally travel along said film, positioning the magnetic thin film so driven adjacent a magnetically anisotropic memory means having binary information successively stored therealong to thereby enable said traveling wall domain to sequentially perturb the successively stored bits of information.

14. The method as set forth in claim 13 wherein said step of applying a magnetic thin film upon said suitable surface is accomplished through the steps required by vacuum deposition.

15. The method as set forth in claim 13 further including the steps of applying by vacuum deposition a magnetic thin film upon a second suitable surface to provide said magnetically anisotropic memory means.

16. A method for providing a high density magnetic storage device comprising the steps of applying a magnetically anisotropic thin film having traveling domain wall characteristics to a suitable surface until the film has a thickness of approximately 1,300 A., applying a starting field to said film to create therein a domain wall, applying a driving field of approximately 10 oersteds to said film to cause said domain wall to travel along said film at an approximate velocity of 1,300 meters per second, positioning the magnetic thin film adjacent a magnetically anisotropic memory means having binary information successively stored therealong to thereby enable said traveling wall domain to sequentially perturb the successively stored bits of information.

17. A method for providing a high density magnetic storage device comprising the steps of preparing a magnetically anisotropic thin film alloy composed of nickel-iron concentrations which correspond to zero magnetostriction and has a nickel to iron ratio which approximates four and which further includes percentages of cobalt as high as 30%, depositing a thin film of this alloy so composed and prepared upon a first member surface, preparing a second magnetically anisotropic thin film alloy composed of nickel-iron concentrations suitable for lagnetic storage purposes, depositing a thin film of this alloy so composed and prepared upon a second member surface, placing said first member surface adjacent said sedond member surface such that the field created by the passage of a traveling domain wall longitudinally along the magnetically easy direction of said first member surface sequentially perturbs the quiescent magnetic condition of the storage film deposited on the surface of said second member.

18. The method as set forth in claim 17 including the additional steps of sequentially storing upon successive segments of the magnetic surface of said second member individual binary signals during a writing operation and sequentially sensing said signals so stored during a reading operation.

References Cited

UNITED STATES PATENTS 3,140,471 8/1964 Fuller ............... 340—174

BERNARD KONICK, Primary Examiner

K. E. KROSIN, Assistant Examiner